(12) United States Patent
Smith et al.

(10) Patent No.: US 7,535,029 B2
(45) Date of Patent: May 19, 2009

(54) MATERIAL SYSTEM FOR TAILORABLE WHITE LIGHT EMISSION AND METHOD FOR MAKING THEREOF

(75) Inventors: Christine A. Smith, Livermore, CA (US); Howard W. H. Lee, Fremont, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1101 days.

(21) Appl. No.: 10/836,919

(22) Filed: Apr. 30, 2004

(65) Prior Publication Data

US 2004/0203311 A1 Oct. 14, 2004

Related U.S. Application Data

(62) Division of application No. 09/664,942, filed on Sep. 19, 2000, now Pat. No. 6,774,560.

(51) Int. Cl.
*H01L 21/20* (2006.01)
(52) U.S. Cl. ............ 257/89; 252/301.6 R; 257/E33.008
(58) Field of Classification Search .................... 257/89, 257/100; 252/301.6 R, 301.6 F
See application file for complete search history.

(56) References Cited

U.S. PATENT DOCUMENTS 6,458,512 B1 * 10/2002 Budd et al. .................. 430/311

OTHER PUBLICATIONS

Smith et al., "Laser Annealing of Trap States In ZnSe Quantum Dots", 98/XThE10, 1998, pp. 98-100.*

* cited by examiner

*Primary Examiner*—Alexander G Ghyka
*Assistant Examiner*—Reema Patel
(74) *Attorney, Agent, or Firm*—Michael C. Staggs; John P. Wooldridge; John H. Lee

(57) ABSTRACT

A method of processing a composite material to tailor white light emission of the resulting composite during excitation. The composite material is irradiated with a predetermined power and for a predetermined time period to reduce the size of a plurality of nanocrystals and the number of a plurality of traps in the composite material. By this irradiation process, blue light contribution from the nanocrystals to the white light emission is intensified and red and green light contributions from the traps are decreased.

12 Claims, 6 Drawing Sheets

MATERIAL SYSTEM FOR TAILORABLE WHITE LIGHT EMISSION AND METHOD FOR MAKING THEREOF

RELATED APPLICATION

This application is a division of U.S. application Ser. No. 09/664,942, filed Sep. 19, 2000, now U.S. Pat. No. 6,774,560 entitled "Material System For Tailorable White Light Emission And Method For Making Thereof."

The United States Government has rights in this invention pursuant to Contract No. W-7405-ENG-48 between the United States Department of Energy and the University of California for the operation of Lawrence Livermore National Laboratory.

FIELD OF THE INVENTION

The present invention relates generally to materials suitable for emitting electromagnetic radiation when suitably excited, and more specifically, further relates to tailoring such emissions by the materials.

BACKGROUND OF THE INVENTION

In the flat panel display field, liquid crystal displays (LCDs) are one of the preeminent display technologies and will continue to play a major role in flat panel displays. An important component of LCDs is the white light emitter that comprises the back light for the display since liquid crystals (LCs) do not generate light—they may only block it. Typically, LCDs allow 5-25% of the back light to pass through. As a result, LCD technology requires a significant amount of energy, and this is an important consideration in lightweight laptop or other display designs. An efficient and spectrally broad white light source would constitute an important contribution to LCD technology.

SUMMARY OF THE INVENTION

Aspects of the invention include a method comprising: directing an energy beam at a pre-processed composite material having a matrix containing a plurality of nanocrystals and a plurality of traps to reduce the size of said plurality of nanocrystals and the number of the plurality of traps to produce a post-processed composite material.

Aspects of the invention further include a method of tailoring white light emission from a composite having optical properties using zinc selenide (ZnSe) nanocrystals comprising: fabricating the ZnSe nanocrystals; incorporating the ZnSe nanocrystals into the matrix; and tuning the optical properties of the composite to a predetermined application.

Aspects of the invention further include a material system comprising: a plurality of nanocrystals; a plurality of first and second traps; and said plurality of nanocrystals, first traps and second traps capable of emitting white light in combination when excited.

BRIEF DESCRIPTION OF THE DRAWINGS

The accompanying drawings, which are incorporated into and form a part of the disclosure.

DETAILED DESCRIPTION

Typically white light emitting devices do so through contributions of several spectral components, usually red, green and blue color light. Nanocrystals embedded in a matrix to form a composite material may be used in these light emitting devices. Nanocrystals are defined as single crystal particles having average dimensions approximately in the range of 1 to 20 nanometers (nm), and typically approximately 2 to 6 nm, but whose dimensions are ultimately determined by the nanocrystal material and dimensions required to effect quantum confinement. Quantum confinement is the shifting of energy levels to higher energies as the particle size decreases. Due to their small size, nanocrystals confine carriers (electrons and holes) three-dimensionally so that the effect of the quantum confinement of carriers may be obtained. The use of the terms "hole" and "holes" herein is intended to refer to vacant electron energy states, typically near the top of an energy band, in a solid. Quantum confinement causes the energy of the light emitted to increase as the size of the nanocrystal decreases, or equivalently, quantum confinement causes the wavelength of the light emitted to decrease as the size of the nanocrystal decreases. The exact size of the nanocrystals is dictated by the color of light to be generated. Blue light, for example, requires smaller nanocrystals than red light. A composite containing the nanocrystals may then be energized by several different types of energy sources (e.g., a light source, electrical current, or electron beam) so that fluorescence may be induced.

Figure 1B:
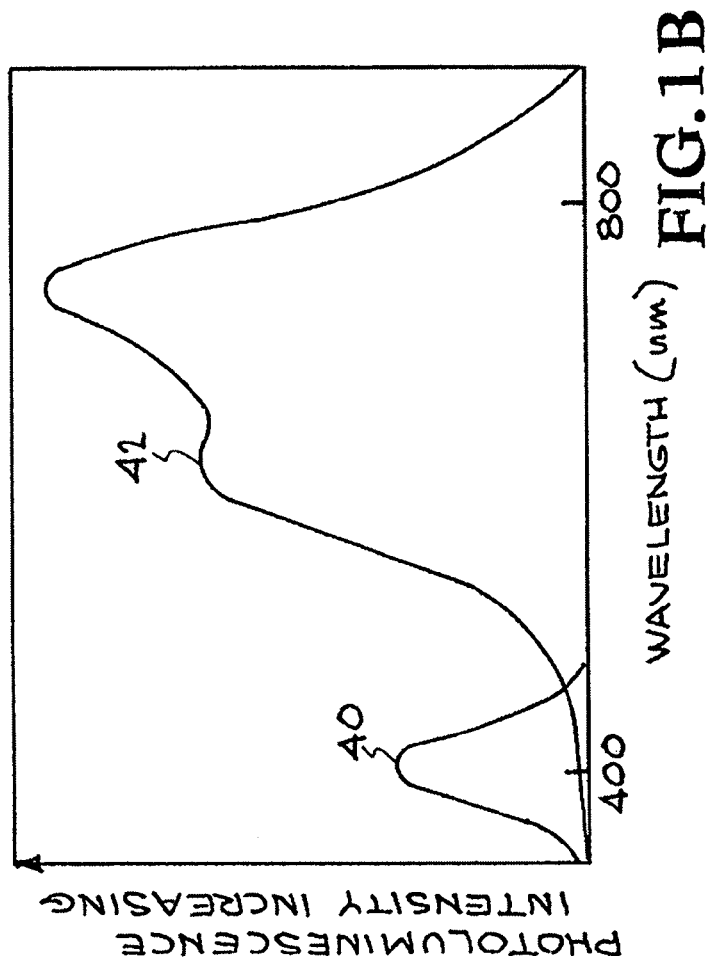
FIG. 1B illustrates a light emission spectrum of the pre-processed composite material of FIG. 1A on a linear scale.
Figure 1A:
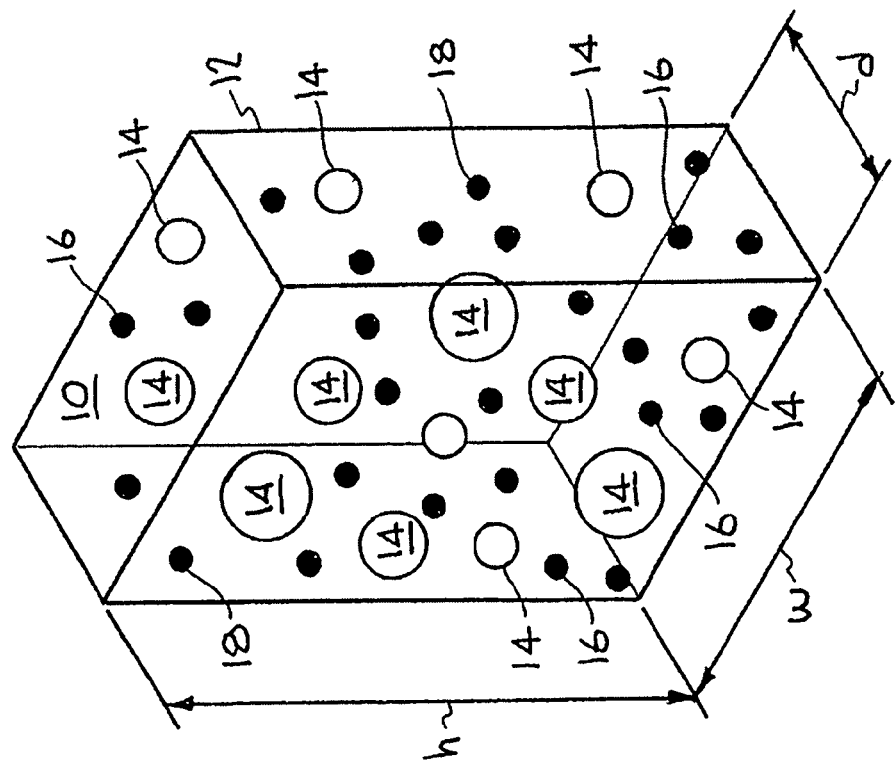
FIG. 1A shows a composite material before the processing steps disclosed herein.

FIG. 1A illustrates a pre-processed composite material 10 containing nanocrystals 14 in a matrix material 12 in a first state before the processing steps described herein. The height, h, of the pre-processed composite material may range from approximately 1 to 10 millimeters (mm), the width, w, of the pre-processed composite material may range from approximately 1 to 10 mm, and the depth, d, may also range from approximately 1 to 10 mm. The matrix material 12 may be a potassium borosilicate glass matrix. However, other matrix materials may also be used that allow the incorporation of nanocrystals and which give rise to impurities or traps 16 and 18. Reference numerals 16 and 18 are used herein to indicate that there are at least two types of traps in the matrix material 12 that emit in the visible light range as will be described below. Reference numeral 16 indicates "red" traps that emit light in the red region and reference numeral 18 indicates "green" traps that emit light in the green region. Traps 16 and 18, as used herein, are defined as any species such as impurities or defects that are not the nanocrystals (though they may be contained within the nanocrystals) and which may either be excited by an energy source to produce light emission or may trap excited carriers (electrons or holes) from the nanocrystals to produce light emission.

The pre-processed composite material 10 of FIG. 1A is constructed in the following manner. ZnSe nanocrystals 14 in a potassium borosilicate glass matrix 12 are prepared by first melting a base glass composition formulated specifically for compatibility with Group II-VI semiconductors. The base glass consists of (in weight (wt) %): 56% silica, 24% potassium oxide, 9% barium oxide, 8% boron oxide, and 3% calcium oxide. Twenty-five to thirty gram batches of this oxide powder mixture are melted in alumina crucibles and refined to remove bubbles at 1400° C. for several hours. Following melt casting, the glasses are ground into a fine powder. Next, ZnSe powder is added and the blended mixture is re-melted again at 1400° C. for approximately one and a half hours before casting the melt into small slabs. Excess ZnSe is added to compensate for the expected volatilization losses from the melting process. As-cast samples may appear reddish orange after overnight annealing at approximately 350° C. High-resolution transmission electron microscopy (HRTEM) on these samples should show crystalline ZnSe particles with varying nanometer sizes. Typical sizes obtained are 5.5±1.7 nm. These as-cast samples may then be successively cycled through re-melting and rapid quenching. HRTEM should show an average diameter particle size for quenched crystalline ZnSe particles of 3.7±1.1 nm. As discussed above, in addition to the ZnSe nanocrystals 14 in the matrix material 12, the pre-processed composite 10 also contains at least two types of traps 16 and 18.

Figure 3B:
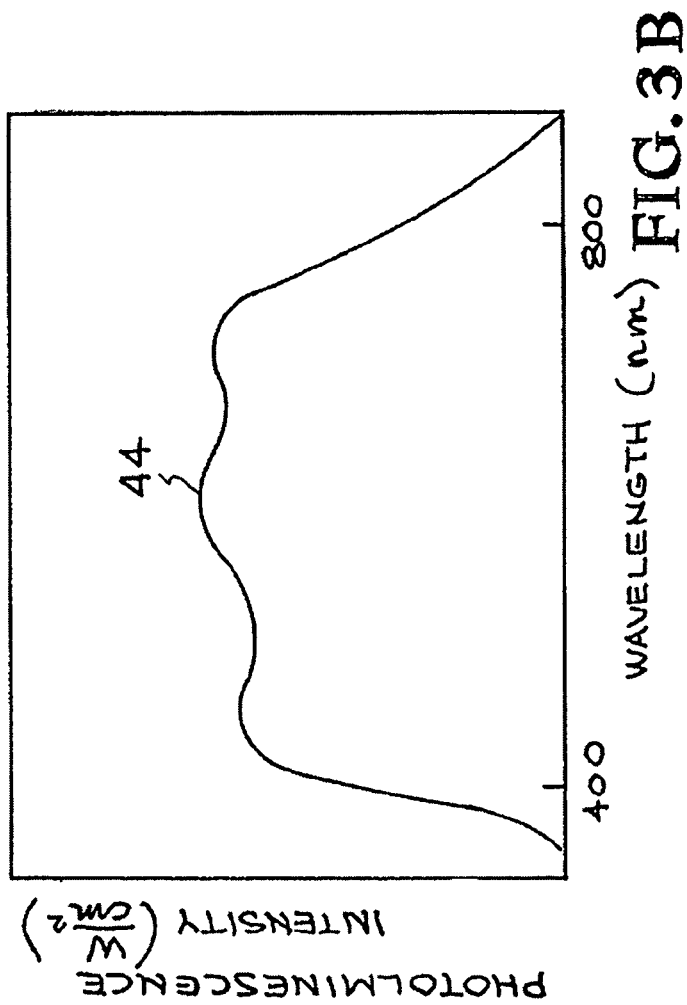
FIG. 3B illustrates a light emission spectrum of the post-processed composite material of FIG. 3A on a linear scale.
Figure 3A:
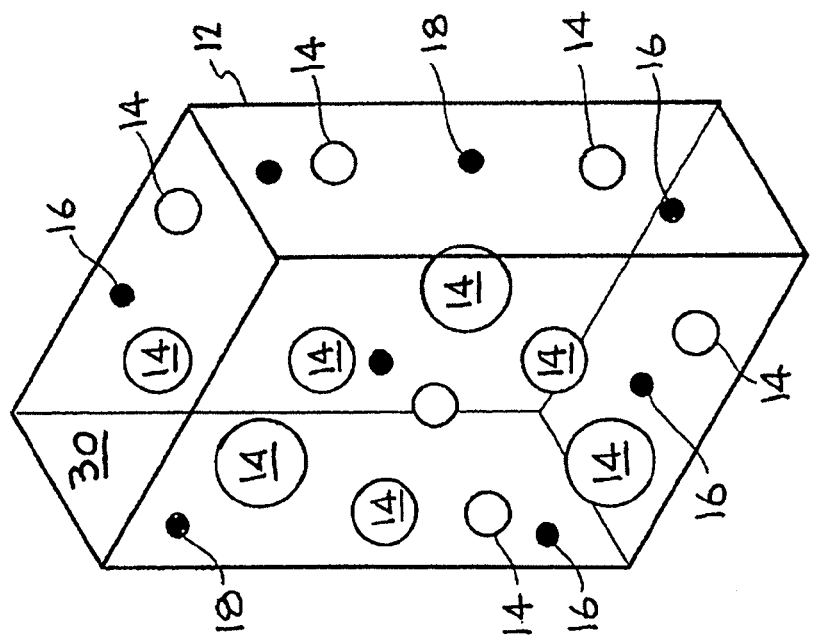
FIG. 3A shows a post-processed composite material after the irradiation process.

The method and device of the disclosed embodiments are concerned with controlling the properties of the nanocrystals and the traps of the pre-processed composite 10 to tailor the blue, red and green contents of the light emission of the pre-processed composite material 10 to control the white light emission of post-processed composite material (reference numeral 30 in FIG. 3A). The white light emission of the post-processed composite material 30 will be tailored (or tuned) by controlling each of the contributions of the blue, red and green components a predetermined level. Depending on the specific application (e.g., indoor lighting, LCD, etc.) for which the post-processed composite 30 is to be used, the contributions of the blue, red and green components of the white light will be predetermined.

The blue spectral content of the light emission of the pre-processed composite 10 is provided by the nanocrystals and may be controlled by controlling the size of the nanocrystals. This is due to the fact that the blue-shift in the emission and absorption spectra of the nanocrystals increases as the particle size decreases due to quantum confinement. In the pre-processed composite material 10, the ZnSe nanocrystals 14 in the matrix material 12 are in a size range where quantum confinement of carriers (electrons and holes) may occur. Quantum confinement in this range will shift the energy levels of the ZnSe conduction band and valence band apart and hence give rise to a blue light contribution from the nanocrystals to the light emission. The blue spectral content of the light emission may also be controlled by controlling the number (or density) of the nanocrystals in addition to controlling the size of the nanocrystals.

The red and green spectral contents of the light emission of the pre-processed composite 10 may be controlled by controlling the number (or density) of red and green traps 16, 18. The traps 16, 18 are capable of trapping carriers and will decrease the efficiency and intensity of the blue light emission if the number of these traps are not reduced during processing to improve the blue light emitting efficiency and intensity of the pre-processed composite 10. These traps may take several forms that, in the case of ZnSe nanocrystals, may include certain selenium (Se) molecules (e.g., $Se_2^-$), selenium (Se) vacancies and zinc (Zn) vacancies. By reducing the number of these red and green traps 16 and 18, the amount of red and green spectral content of the light emission from the post-processed composite 30 may be reduced and the emission of the blue spectral content will be increased.

Figure 2:
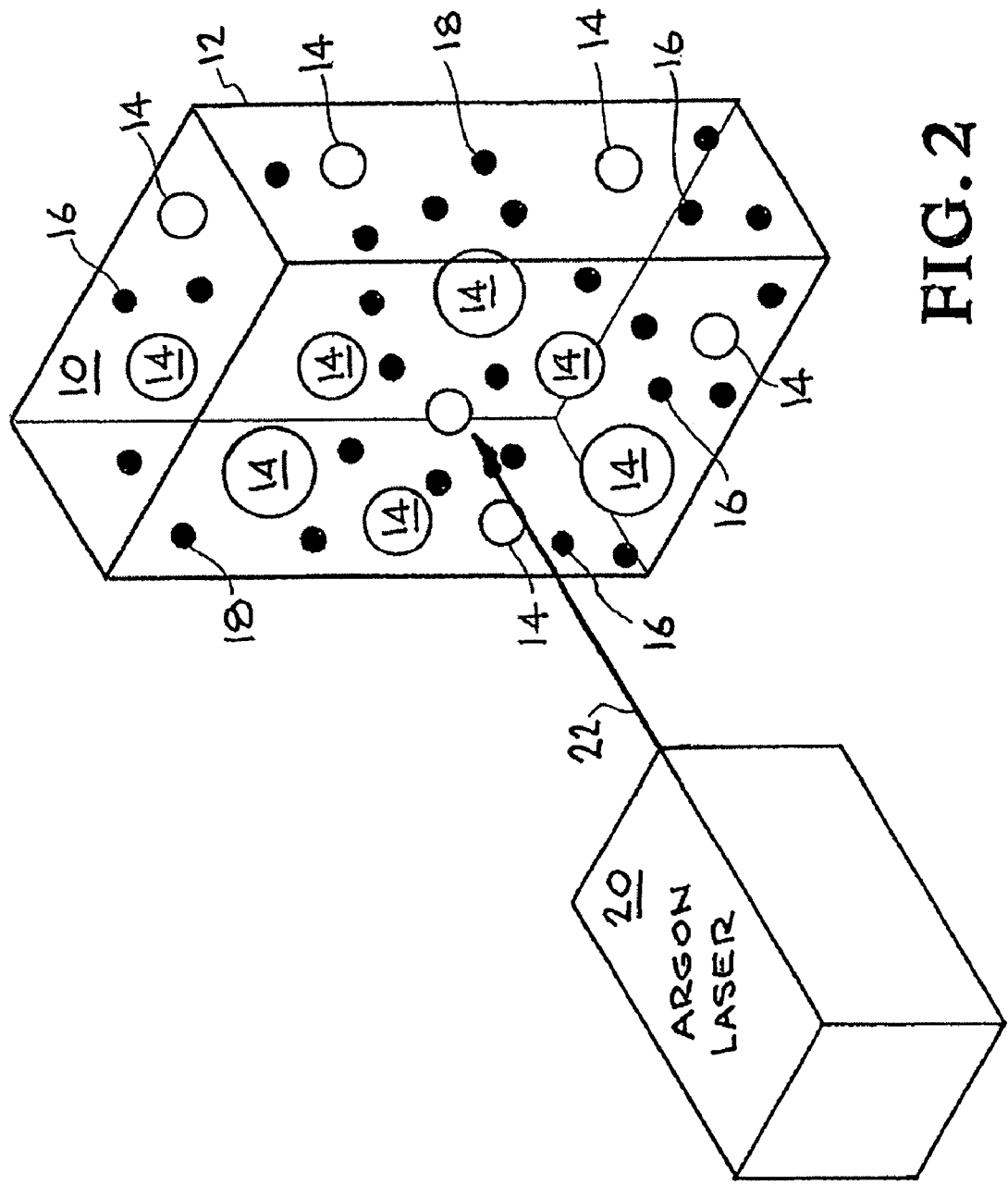
FIG. 2 shows the composite material of FIG. 1A being irradiated.

FIG. 2 discloses the pre-processed composite 10 being irradiated and FIG. 3A shows the effects after irradiation on the post-processed composite 30. The exact makeup of the pre-processed composite 10 with respect to nanocrystals and traps may vary before the processing disclosed herein. However, a consistent white light emission is desired from the post-processed composite 30 depending on a specific application. Indoor lighting, liquid crystal displays, and light emitting diodes are just some of the specific applications that the post-processed composite 30 may be used in and the white light emission of these specific applications will also vary.

Therefore, a first step in the method disclosed herein is to obtain a spectrum of the emitted light for the pre-processed composite 10 using an optical excitation source (e.g., laser, incandescent light). The spectrum of the emitted light is obtained nondestructively and without changing the properties of the pre-processed composite 10. An example of the spectrum of the emitted light of a pre-processed composite 10 is in FIG. 1B. Reference numeral 40 indicates weak blue light emission from the pre-processed composite 10 due to the presence of a large number and density of traps 16, 18 which trap the carriers emitted from the nanocrystals 14 and reduce the blue emission. Reference numeral 42 indicates the spectrum of the emitted light from the large number and density of traps 16, 18 in the pre-processed composite 10. As may be observed in FIG. 1B, emission in the red and green spectral range from the red and green traps 16, 18 dominates the overall light emission from the pre-processed composite due to the large number and density of the traps 16, 18.

In a second step, an analysis of the results of the spectral evaluation process discloses the amount of irradiation the preprocessed composite 10 will require to produce a white light emission for a specific application.

In a third step, the pre-processed composite 10 is irradiated for a predetermined amount of time. The irradiation may be performed using an optical energy source. Examples of suitable energy sources include lasers, incandescent lamps, arc lamps, electron beams, and other types of optical power sources. As discussed above, the power applied and the duration of the irradiation step will be predetermined based on the specific application or end-use that the pre-processed composite 10 is being designed for and the results of the initial spectral evaluation step. The power used during the irradiation may range from approximately 10 milliWatts (mW) to 10 Watts. The duration of the irradiation may range from approximately 1 to 30 minutes.

FIG. 2 illustrates, for exemplary purposes, an argon ion laser 20 irradiating on all lines 22 the pre-processed composite 10. In the example shown, to change from a pre-processed composite 10 to a white light emitting post-processed composite 30 as shown in FIG. 3A requires irradiation having power of approximately 53 mW of power for approximately 2 minutes using all lines of an argon ion laser.

There are at least two factors or variables which determine the optimum power and time duration of the irradiation step to achieve the desired spectral makeup of the white light emission of the post-processed composite 30. First, the decrease in the size of the ZnSe nanocrystals and, second, the decrease in the number (or density) of red and green traps 16, 18. As shown in FIG. 3A, the greater power used and the longer the pre-processed composite 10 is irradiated, the sizes of the ZnSe nanocrystals are decreased and, as a result, blue emission of the white light emission is increased. This result may be explained by the fact that the oscillator strength, which affects the intensity and efficiency of light emission, of quantum confined nanocrystals generally will have increased as the nanocrystal size decreases. Smaller nanocrystal sizes are required to generate blue light. Therefore, as a result of the quantum confined nature of the blue light emission, a high efficiency for the blue component may be expected in the post-processed composite 30. Also, as shown by FIG. 3A, the greater power used and the longer the pre-processed composite 10 is irradiated, the less red and green trap emission will result from the red and green traps 16, 18 because their number (or density) is reduced. The decrease in red and green trap emission not only produces less red and green spectral content to the white light emission from the post-processed composite 30, but also more blue emission is produced which previously is being trapped by the large number of red and green traps 16, 18. The red and green light may result from trapping of the excitation energy initially absorbed by the ZnSe nanocrystals that do not emit blue light. Therefore, most of the excitation energy given to the ZnSe nanocrystals will either be emitted as blue, green or red, and therefore, the overall efficiency of white light emission should be high. Defining the efficiency as the number of blue, green or red photons emitted by the composite divided by the number of excitation photons absorbed by the composite, the efficiency of the post-process composite 30 will be approximately in the range of 50 to 90% and, typically, greater than approximately 80%. The reduction in the red and green spectral composition of the white light emission and the increase in the blue component of the white light emission are shown by reference numeral 44 in FIG. 3B.

Figure 4:
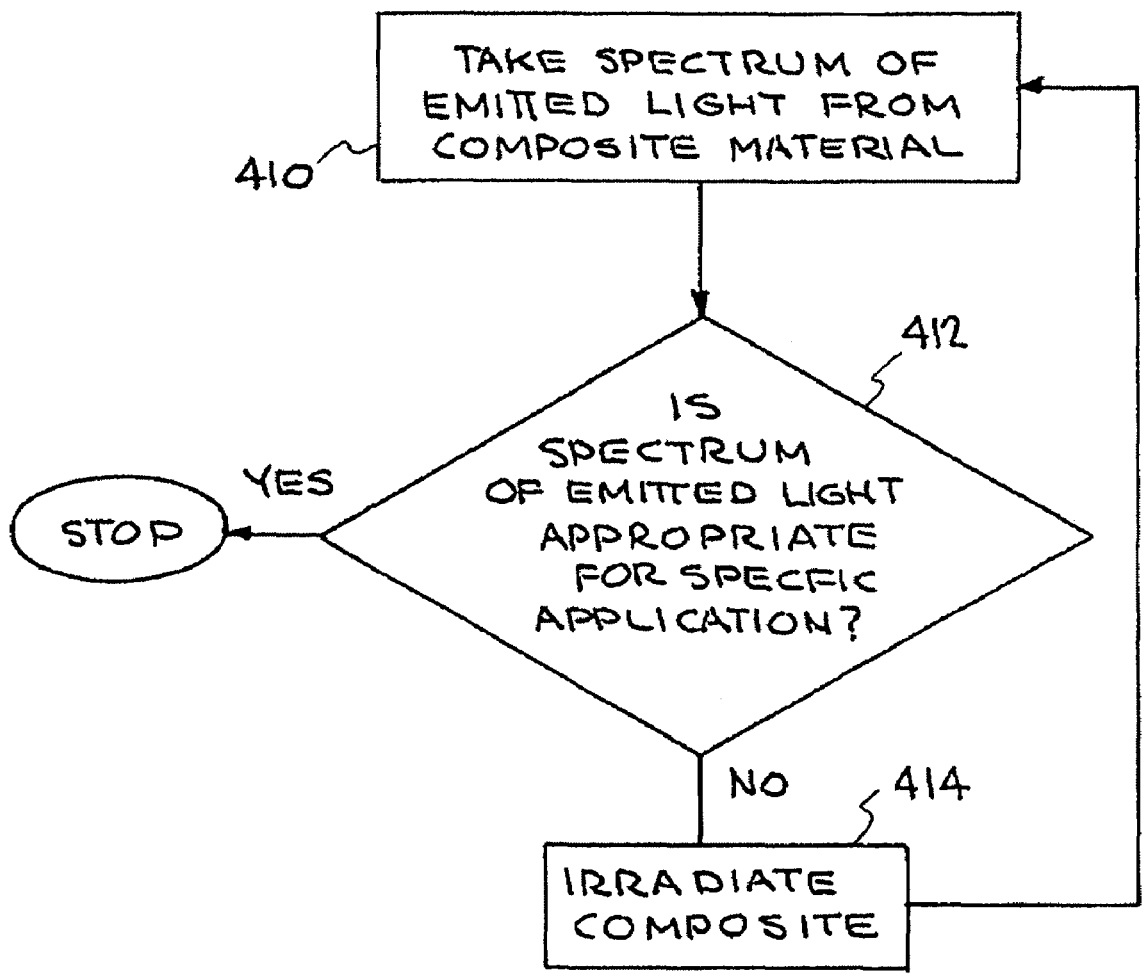
FIG. 4 illustrates a flow diagram of an iterative processing method of the present disclosure.

After the irradiation step, another spectrum of the emission from the pre-processed composite is taken. If the spectral content does not meet the requirements of the specific application, multiple iterations may achieve the desired result. FIG. 4 illustrates the iterative steps in flow diagram from. In step 410, the spectrum is taken. In step 412, a determination is made whether the spectrum is appropriate for 7the specific application. If the determination is positive, an efficient white light emitter composite has been created. If the determination is negative, in step 414, the pre-processed composite 10 is further irradiated. The number of iterations may typically range from approximately one to ten iterations depending on the specific application. However, it is to be understood that the number of iterations is not to be limited to ten. As previously discussed, the number of iterations will depend on the nature of the pre-processed composite and the specific application for which it is to be used.

In alternative embodiments, the blue light contribution to the white light emission may also be controlled by decreasing the number (or density) of the nanocrystals 14 in the matrix 12 in addition to decreasing their size.

In alternative embodiments, the nanocrystals 14 may also be selected from a group of similarly wide bandgap materials such as from Group II-VI, Group III-V, and Group IV semiconductor materials capable of emitting visible light upon excitation. Other examples of suitable nanocrystals may include CdSe and CdS.

In alternative embodiments the material used for the matrix 12 may be from a group that is of a transparently visible material suitable for having nanocrystals embedded within. Specifically, materials included in this group may include polymers (e.g., polystyrene), gels that have been solidified in a particular manner (e.g., sol-gels such as silica sol-gel), and materials having traps that emit light in the red and green spectral ranges.

In alternative embodiments the traps may be from a group of materials that emit visible light that may compliment the blue emission from the nanocrystals to give white light emission. Such trap materials may emit cyan and yellow light.

The resulting processed composite material may be used in a wide variety of applications including full color flat panel displays, scanners, facsimile machines, copy machines, optical data storage devices, internal lighting applications, light-emitting diodes (LEDs), automobile interior and exterior lighting, traffic safety lights, toys, and other general lighting purposes. In all these cases, an efficient and robust white light emitter is essential for high brightness, low weight and long operational life.

Figure 5:
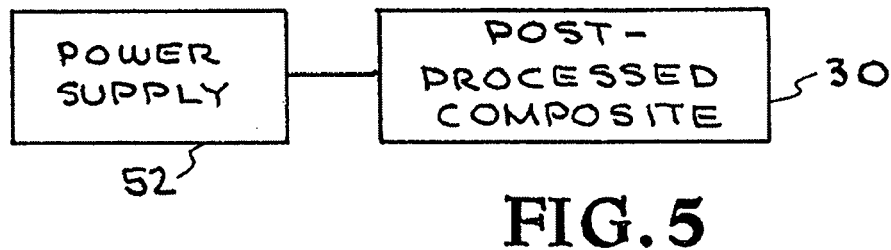
FIG. 5 discloses a white light source for general lighting applications using the post-process composite material.

FIG. 5 discloses a spectrally broad white light source for general lighting applications such as internal lighting for homes, automobiles, toys and exterior lighting. The power supply 52 provides the energy source to excite the post-processed composite 30 to give a white light emission. The power supply 52 may be from a stationary power supply source such as a conventional electrical socket or a mobile power supply such as a battery or batteries.

Figure 6:
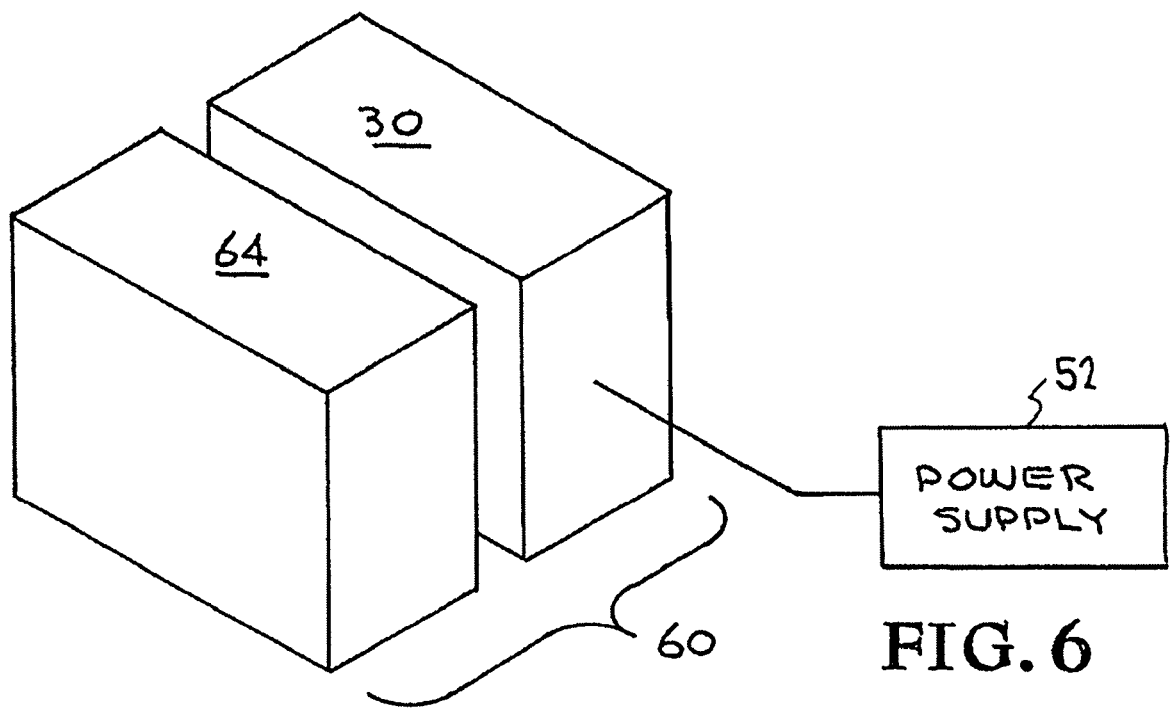
FIG. 6 illustrates a liquid crystal display (LCD) using the post-process composite material as the white emitting back light.

FIG. 6 illustrates a liquid crystal display (LCD) 60 using the post-process composite material 30 as the white emitting back light. The power supply 52 provides an energy source to excite the post-processed composite material 30 in the LCD 60. The composite material 30 provides white light emission to a matrix addressable liquid crystal optical gate 64 and a picture element (pixel) display is produced. FIG. 6 illustrates a monochrome liquid crystal display. For a full color liquid crystal display, three color filters (e.g., blue, red, and green) may be required for each pixel.

Figure 7:
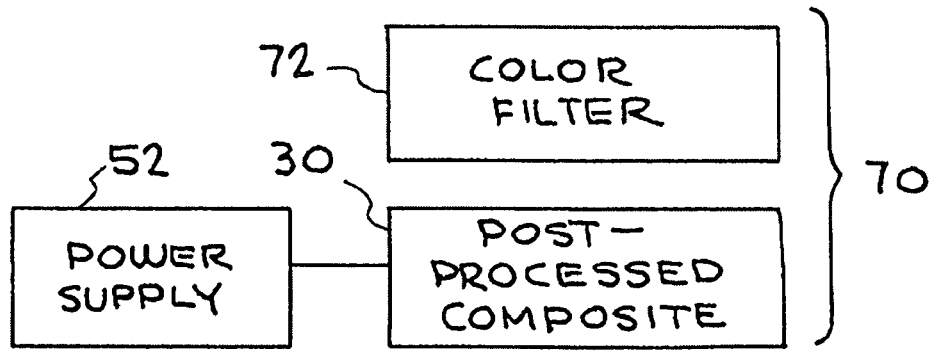
FIG. 7 illustrates a light emitting diode (LED) using the post-process composite material having a various colors.

FIG. 7 illustrates a light emitting diode (LED) 70 having various colors. The power supply 52 excites the post-processed composite 30 which emits white light. The white light emission is then transmitted through a color filter 72 (or color filters) which provides the color from the LED.

Figure 8:
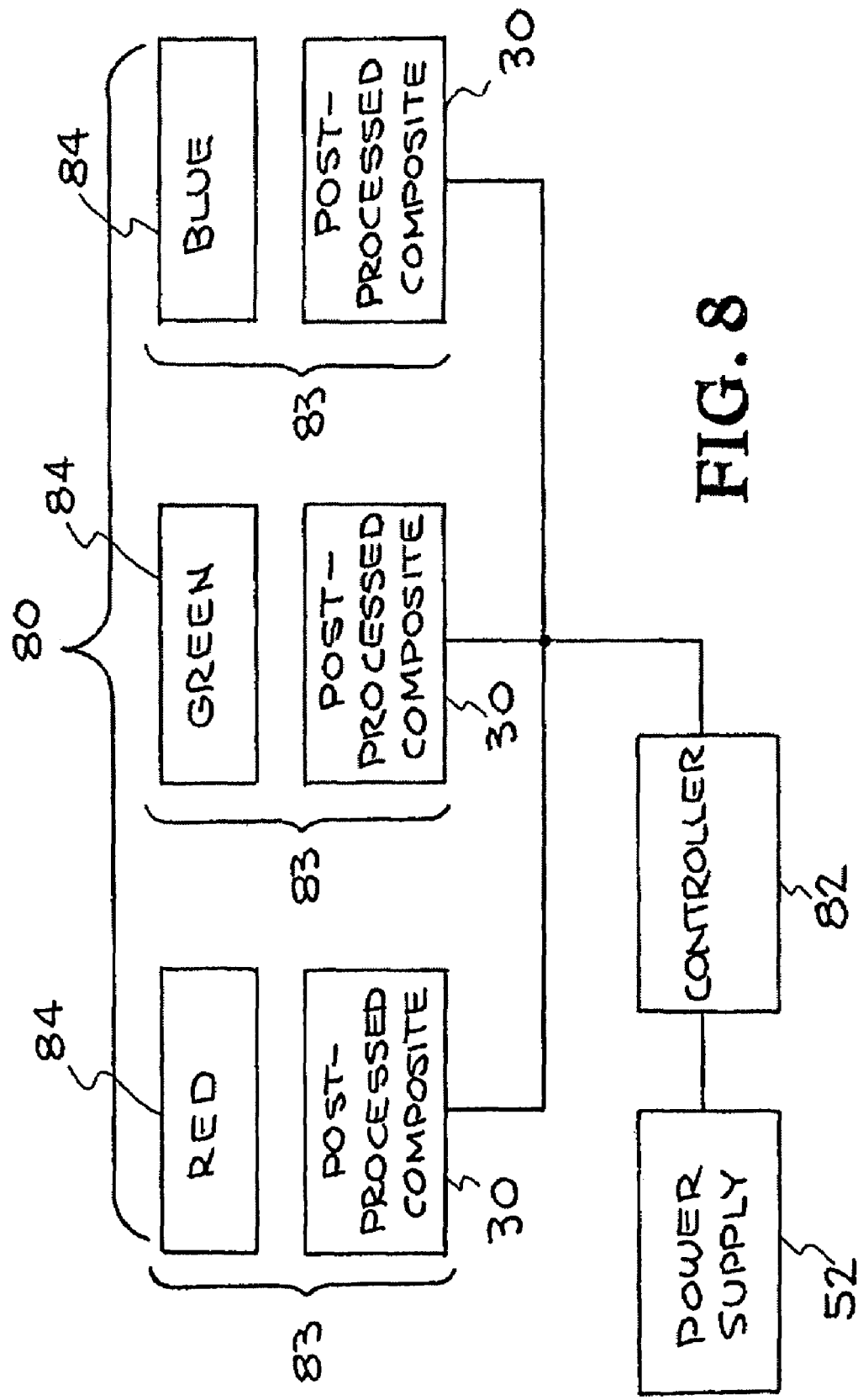
FIG. 8 illustrates a pixel of a full color electroluminescent display composed of a plurality of sub-pixels each including a post-processed composite.

FIG. 8 illustrates a pixel 80 of a full color electroluminescent display composed of a plurality of sub-pixels 83 each having a post-processed composite 30. Transmission of the white light from one of the post-processed composites 30 through red, green or blue filters 84 provides the color from an individual pixel 80. Power supply 52 is coupled to a controller 82 which specifies which composite 30 is energized and, therefore, specifies which color is emitted from the pixel 80. The controller 82 may be a matrix addressing circuit capable of distributing the energy from the power supply 52 to each sub-pixel 83.

An advantage of the exemplary embodiments disclosed herein is that the spectral makeup of the white light emission may be controlled by a simple and inexpensive irradiation process.

Another advantage of the exemplary embodiments is that the resulting processed composite will have shorter wavelength operation which is enabled by the blue-shifted quantum confined energy levels.

The foregoing is illustrative of the present invention and is not to be construed as limiting thereof. The invention is defined by the following claims, with equivalents of the claims to be included therein.

The invention claimed is:

1. A method of tailoring white light emission from a composite having optical properties using ZnSe nanocrystals comprising:

fabricating said ZnSe nanocrystals;

incorporating said ZnSe nanocrystals into a matrix to form a composite; and tuning the optical properties of said composite to a predetermined application, wherein the step of fabricating said ZnSe nanocrystals includes incorporating said ZnSe in an interface material located between said matrix and said ZnSe nanocrystals and wherein said interface material comprises glass.

2. The method of claim 1, wherein said optical properties comprise quantum confined bandedge emission from the ZnSe nanocrystals.

3. The method of claim 1, wherein said tuning of said optical properties is conducted by irradiating said composite.

4. The method of claim 1, wherein said tuning of said optical properties increases the efficiency of the spectral yield of said while light emission by optimizing the number density of the ZnSe nanocrystals.

5. The method of claim 1, wherein said tuning step controls contribution of a blue spectral region of the white light emission from quantum confined bandedge emission of the ZnSe nanocrystals.

6. The method of claim 1, wherein said tuning step controls contribution of blue, red and green portions of the white light emission by controlling the size of the ZnSe nanocrystals and the number of traps in the composite.

7. The method of claim 1, wherein said tuning of said optical properties comprises laser irradiating said composite to control amounts of red and green emission from a plurality of traps and to control blue bandedge emission from said ZnSe nanocrystals.

8. The method of claim 1, wherein said glass comprises a potassium borosilicate.

9. A method of tailoring white light emission from a composite having optical properties using ZnSe nanocrystals comprising:

fabricating said ZnSe nanocrystals;

incorporating said ZnSe nanocrystals into a matrix to form a composite; and tuning the optical properties of said composite to a predetermined application, wherein the step of fabricating said ZnSe nanocrystals further comprises incorporating said ZnSe in an interface material located between said matrix and said ZnSe nanocrystals and wherein said interface material comprises traps capable of emitting light in the red and green region of the spectrum.

10. A method of tailoring white light emission from a composite having optical properties using ZnSe nanocrystals comprising:

fabricating said ZnSe nanocrystals;

incorporating said ZnSe nanocrystals into a matrix to form a composite; and tuning the optical properties of said composite to a predetermined application, wherein the step of fabricating said ZnSe nanocrystals further comprises incorporating said ZnSe in an interface material located between matrix and said ZnSe nanocrystals and wherein said interface material is a polymer.

11. The method of claim 10, wherein said polymer comprises polystyrene.

12. A method of tailoring white light emission from a composite having optical properties using ZnSe nanocrystals comprising:

fabricating said ZnSe nanocrystals;

incorporating said ZnSe nanocrystals into a matrix to form a composite; and tuning the optical properties of said composite to a predetermined application, wherein the step of fabricating said ZnSe nanocrystals further comprises incorporating said ZnSe in an interface material located between matrix and said ZnSe nanocrystals and wherein said interface material is a sol-gel.

* * * * *